(12) United States Patent
Christie, IV

(10) Patent No.: US 9,369,582 B2
(45) Date of Patent: *Jun. 14, 2016

(54) AUDIO CALL SCREENING FOR HOSTED VOICEMAIL SYSTEMS

(71) Applicant: Apple Inc., Cupertino, CA (US)

(72) Inventor: Samuel Christie, IV, Cary, NC (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/541,435

(22) Filed: Nov. 14, 2014

(65) Prior Publication Data

US 2015/0071420 A1    Mar. 12, 2015

Related U.S. Application Data

(63) Continuation of application No. 14/169,429, filed on Jan. 31, 2014, now Pat. No. 8,917,830, which is a continuation of application No. 10/628,180, filed on Jul. 28, 2003, now Pat. No. 8,666,034.

(51) Int. Cl.
*H04M 1/64* (2006.01)
*H04M 3/533* (2006.01)
*H04M 3/436* (2006.01)

(52) U.S. Cl.
CPC .......... *H04M 3/53333* (2013.01); *H04M 3/436* (2013.01); *H04M 3/4365* (2013.01); *H04M 3/533* (2013.01); *H04M 3/53308* (2013.01); *H04M 2203/4563* (2013.01)

(58) Field of Classification Search
USPC ........ 379/88.12, 88.18, 88.22, 88.25, 202.01, 379/211.02, 214.01
See application file for complete search history.

(56) References Cited

U.S. PATENT DOCUMENTS

| | | | |
|---|---|---|---|
| 6,215,857 B1 | 4/2001 | Kasiviswanathan | |
| 7,054,418 B2 | 5/2006 | Muller | |
| 7,245,713 B1 | 7/2007 | Simpson et al. | |
| 2001/0010716 A1* | 8/2001 | Smith | H04L 12/2856 379/106.05 |
| 2001/0024492 A1* | 9/2001 | Tanaka | H04M 3/428 379/156 |
| 2002/0076022 A1* | 6/2002 | Bedingfield | 379/142.01 |
| 2002/0099801 A1* | 7/2002 | Ishii | 709/219 |

OTHER PUBLICATIONS

U.S. Appl. No. 14/169,429, filed Jan. 31, 2014, Samuel H. Christie IV.

* cited by examiner

*Primary Examiner* — Quynh Nguyen
(74) *Attorney, Agent, or Firm* — Meyertons, Hood, Kivlin, Kowert & Goetzel, P.C.

(57) ABSTRACT

The present invention allows a user to screen messages being left at a hosted voicemail system from a telephone terminal. Incoming calls intended for the telephone terminal are routed to the voicemail system immediately or after attempting to connect incoming call to the telephone terminal. As the caller is leaving a message at the voicemail system, a connection between the incoming call, voicemail system, and telephone terminal is established to allow the user to listen to the message and decide whether to take the call. The user may decide to take the call or let the caller finish leaving the message. In one embodiment, the telephone terminal is equipped to open only the speaker channel for monitoring the message and will provide a fully bi-directional connection if the user takes the call. The supporting switch and telephone terminal communicate with each other to facilitate the monitoring and taking of calls.

19 Claims, 8 Drawing Sheets

AUDIO CALL SCREENING FOR HOSTED VOICEMAIL SYSTEMS

CROSS-REFERENCE TO RELATED APPLICATIONS

This application is a continuation of U.S. patent application Ser. No. 14/169,429, filed Jan. 31, 2014, which is a continuation of U.S. patent application Ser. No. 10/628,180, filed Jul. 28, 2003, now U.S. Pat. No. 8,666,034, which are hereby incorporated by reference as if full and completely set forth herein.

FIELD OF THE INVENTION

The present invention relates to telephony communications, and in particular to allowing a user to screen calls by listening to a voicemail message being left in a hosted voicemail system from a telephone device.

BACKGROUND OF THE INVENTION

Telephone users with personal telephone answering devices can listen to callers leaving messages thereon, and during the call, decide to take the call. This highly desirable technique for screening calls is unavailable in hosted voicemail systems, because the voicemail system is a separate entity in the telephone network and is not directly associated with any individual's telephone device. In a hosted voicemail system, incoming calls that are not answered are forwarded to the voicemail system. Since many users, especially residential users, rely on the ability to screen calls, service providers with hosted voicemail systems are at a competitive disadvantage when trying to market hosted voicemail services to their subscribers. Accordingly, there is a need to provide call screening for users subscribing to hosted voicemail services.

SUMMARY OF THE INVENTION

The present invention allows a user to screen messages being left at a hosted voicemail system from a telephone terminal. Incoming calls intended for the telephone terminal are routed to the hosted voicemail system immediately or after attempting to connect incoming call to the telephone terminal. As the caller is leaving a message at the hosted voicemail system, a connection between the incoming call, the hosted voicemail system, and the telephone terminal is established to allow the user to listen to the message and decide whether to take the call. The user may decide to take the call or let the caller finish leaving the message. In one embodiment, the telephone terminal is equipped to open only the speaker channel for monitoring the message and will provide a fully bi-directional connection using a microphone channel and the speaker channel if the user takes the call. Further, the supporting switch and the telephone terminal may communicate with each other to facilitate the monitoring and taking of calls.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention provides for audio call screening for hosted voicemail systems. In essence, a user will subscribe to a hosted voicemail system, which is a voicemail system located remotely from her telephone terminal and generally supported or provided by her telephone service provider or other servicing entity. In these hosted voicemail systems, unanswered calls are directed to the hosted voicemail system, where messages for the user may be left. Unfortunately, the remote nature of the voicemail system does not allow the user to listen to the message being left and make a decision about whether to answer the call based thereon.

Figure 1:
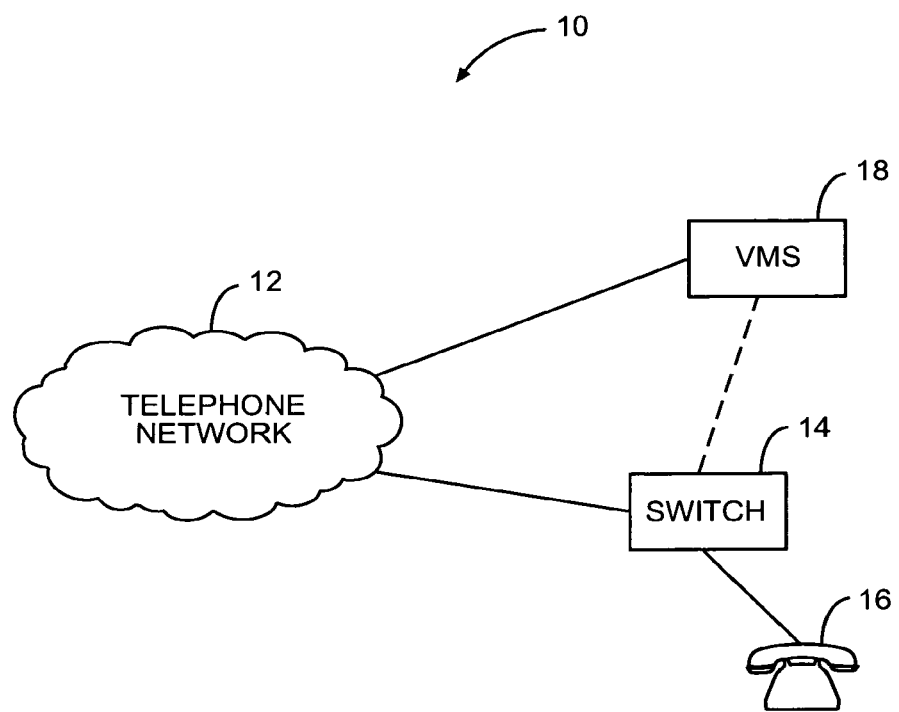
FIG. 1 is a block representation of a communication environment according to the present invention.

With reference to FIG. 1, an exemplary communication environment 10 is shown centered about a telephone network 12, such as the Public Switched Telephone Networks (PSTN) or other wired or wireless telephony network, wherein a switch 14 supports a telephone terminal 16 through wired or wireless means. The switch 14 may be central to a central office exchange, private branch exchange, mobile switching center, or packet-based telephone system. A hosted voicemail system (VMS) 18 is shown in association with the telephone terminal 16 and is operatively coupled to the switch 14 directly or indirectly via the telephone network 12 in traditional fashion.

Figure 2:
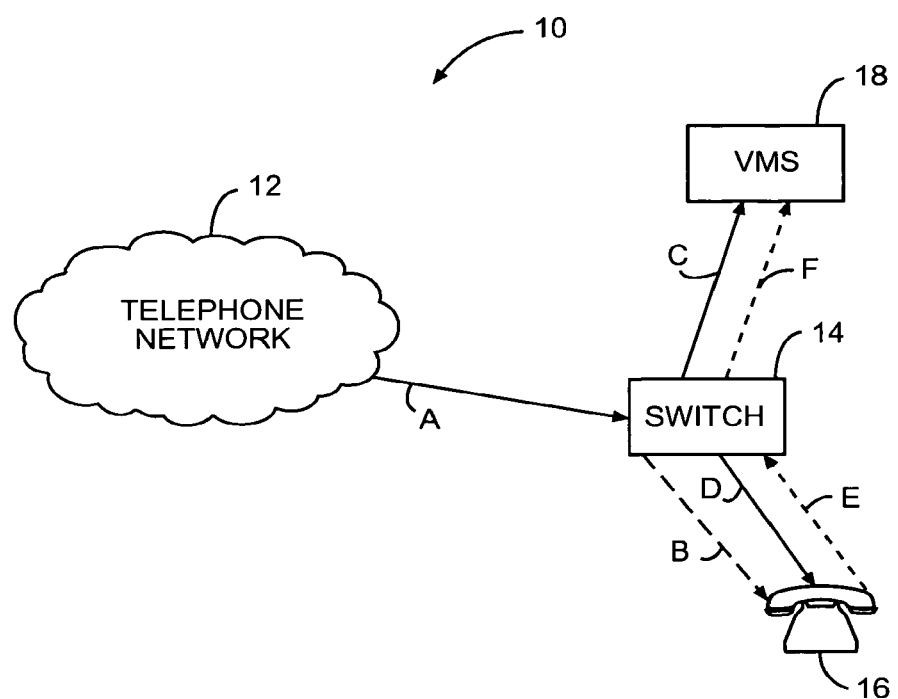
FIG. 2 illustrates an exemplary call flow according to a first embodiment of the present invention.

The following description highlights several embodiments wherein the user of the telephone terminal 16 can effectively screen incoming calls by listening to messages being left in the VMS 18 and have the option of answering the call while a voicemail message is being left by the caller in the VMS 18. A first embodiment is illustrated in FIG. 2. Initially, an incoming call intended for the telephone terminal 16 is received by the switch 14 (step A), which takes the necessary steps to cause the telephone terminal 16 to ring (step B). If the call to the telephone terminal 16 is not answered after a select number of rings, the switch 14 will forward the call to the VMS 18 (step C). In this embodiment, the switch 14 will recognize that the user of the telephone terminal 16 has subscribed to a call screening service, and will create a conference or other appropriate connection to the telephone terminal 16, and send a message or signal to the telephone terminal 16 to open a speaker channel (step D). The conference connection effectively connects the caller, the VMS 18, and the telephone terminal 16, such that both the VMS 18 and the telephone terminal 16 receive any audio content provided by the caller. The speaker channel will effectively allow the telephone terminal 16 to provide any audio appearing on the connection to be presented at the telephone terminal speaker, such that the user may listen to the caller leaving a voicemail message.

If the user answers the telephone terminal 16 while the caller is leaving a voicemail message, the switch 14 will detect the telephone terminal 16 being answered through in-band or out-of-band signaling (step E), and send a message to the VMS 18 indicative of the call being answered by the user (step F). The message sent to the VMS 18 may be a Release message having a cause value that indicates why the Release message was sent. Further, the Release message may provide additional information instructing the VMS 18 how to handle the voicemail message fragment that was recorded prior to the user answering the call. In the meantime, the caller and user may continue with the call over the conference connection with the telephone terminal 16. This embodiment is considered a passive call screening technique, because the user may screen the call without any interaction with the telephone terminal 16.

Figure 3:
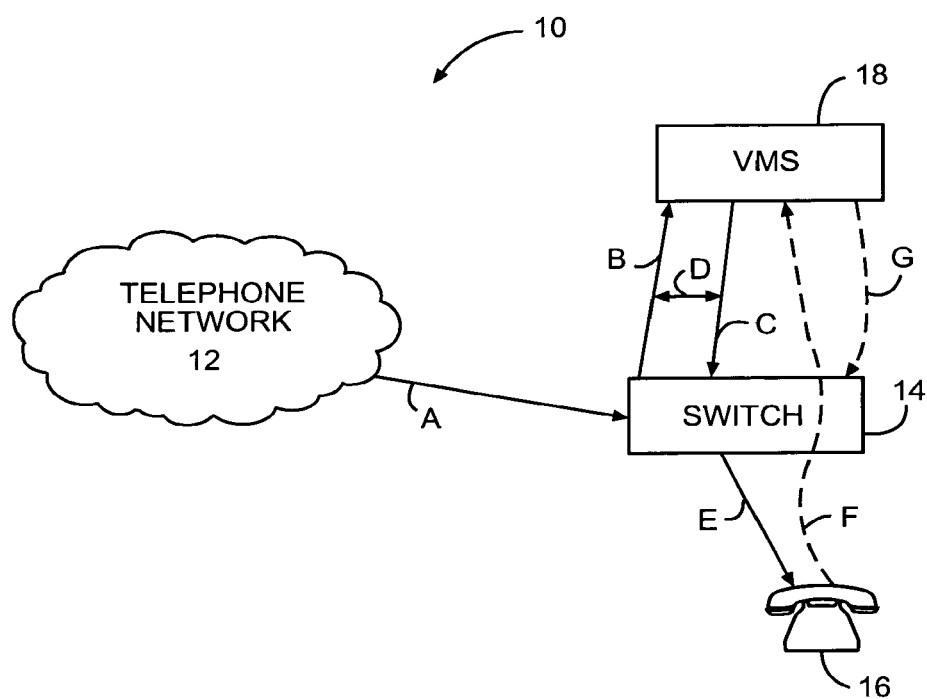
FIG. 3 illustrates an exemplary call flow according to a second embodiment of the present invention.

Turning now to FIG. 3, a second embodiment implementing passive call screening is illustrated. Initially, an incoming call intended for the telephone terminal 16 is received at the switch 14 (step A), which is configured to forward all incoming calls directly to the VMS 18 (step B), without attempting to establish a connection to the telephone terminal 16. Upon answering the forwarded incoming call, the VMS 18 will initiate a call to the telephone terminal 16 (step C) and take the necessary steps to effectively connect the incoming call and the newly initiated call (step D). Such connection may be any type of conferencing technique, which may include bridging the two calls in the VMS 18 or the switch 14, or instructing the switch 14 to establish a three-way call between the caller, VMS 18, and telephone terminal 16. During this period, the VMS 18 will answer the incoming call and take the necessary steps to prepare for recording a message from the caller.

The switch 14 will recognize that the call intended for the telephone terminal 16 is from the VMS 18, which is providing a call screening service, and instead of forwarding the call to the VMS 18 like all other incoming calls, will take the necessary steps to cause the telephone terminal 16 to ring (step E). The telephone terminal 16 will automatically answer calls after a set number of rings, and automatically open the speaker channel to allow the user to listen to a message being left by the caller on the VMS 18. If the user does not answer the telephone terminal 16, the VMS 18 will record the message in traditional fashion. If the user answers the telephone terminal 16, a signal or other message is directly or indirectly sent to the VMS 18 (step F) to alert the VMS 18 that the telephone terminal 16 has been answered. Further, the telephone terminal 16 will turn on any necessary microphones to allow full bi-directional communication. In one embodiment, the signal sent to the VMS 18 is an in-band signal generated by the telephone terminal 16 automatically in response to user interaction or an actual code entered by the user, wherein the code is recognized by the VMS 18 as a signal that the telephone terminal 16 has been answered. In response, the VMS 18 may stop recording, as well as communicate with the switch 14 to effectively transfer the call to a connection between the switch 14 and the telephone terminal 16 (step G). This avoids wasting resources of the VMS 18 by not connecting the call through the VMS 18 but directly through the switch 14. The caller and user will continue their call. In this embodiment, there is no need for the switch 14 and the telephone terminal 16 to have the ability to communicate with each other to trigger initiation of the speaker channel.

Alternatively, the switch 14 does not have to recognize that the call intended for the telephone terminal 16 is from the VMS 18. The telephone terminal 16 may be configured to recognize calls from the VMS 18, and automatically open the speaker channel upon receiving calls from the VMS 18. Further, the telephone terminal 16 will ignore incoming calls that are not from the VMS 18, and as such, the switch 14 will forward such incoming calls to the VMS 18. In this alternative embodiment, the VMS 18 may be configured to provide additional caller identification information pertaining to the originator of the incoming call, in addition to any identifying information for the VMS 18, such that the telephone terminal 16 can recognize the call from the VMS 18 while providing caller identification information for the original caller.

Figure 4:
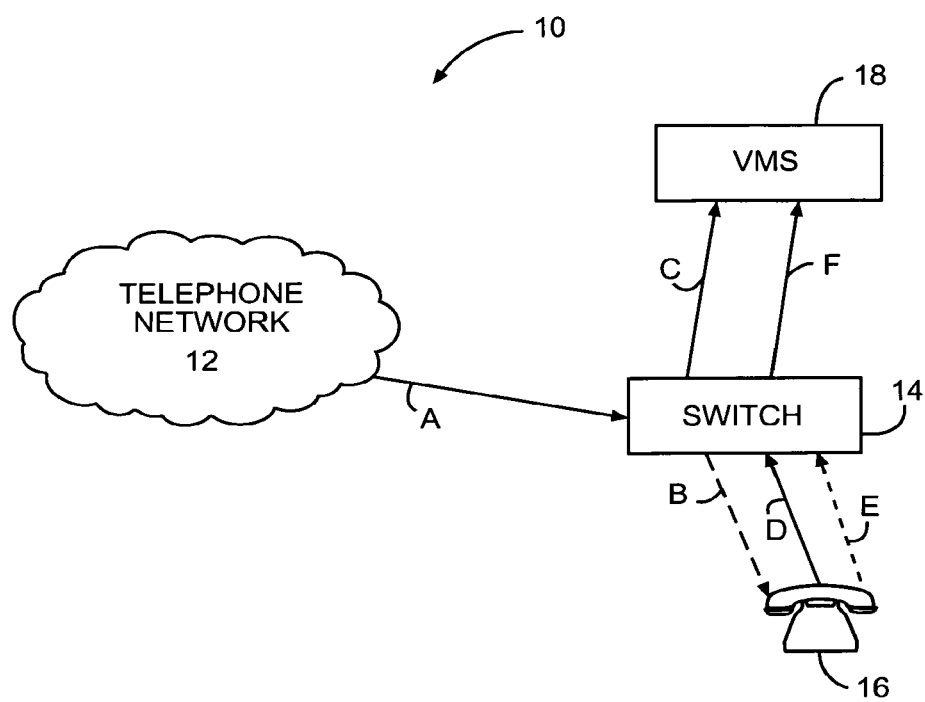
FIG. 4 illustrates an exemplary call flow according to a third embodiment of the present invention.

With reference to FIG. 4, an active call screening technique is illustrated, wherein a user must interact with the telephone terminal 16 prior to being able to listen to messages being left in the VMS 18. Initially, the switch 14 receives an incoming call intended for the telephone terminal 16 (step A) and attempts to connect the call to the telephone terminal 16 (step B). After a prescribed number of rings, the call is forwarded to the VMS 18 by the switch 14 (step C). At this point, the user will know that the incoming call is likely being forwarded to the VMS 18, which is concurrently taking the necessary steps to answer the forwarded call and record a voicemail message. If the user wishes to activate call screening in this embodiment, she will activate the telephone terminal 16 and, upon receipt of a dial tone, dial a service activation code (or feature code) such as *33 for call screening (step D). The switch 14 will recognize the service activation code as well as the telephone terminal 16 from which the code was received, and establish a conference between the call forwarded to the VMS 18 and the telephone terminal 16 in response to the service activation code being dialed. If the user decides to take the call based on listening to the message being left, a signal (in-band or out-of-band) is sent to the switch 14 (step E), which will release the connection for the forwarded call to the VMS 18. The switch 14 will also send a message, such as a cause value message, to the VMS 18 indicating why the connection was released (step F), and the VMS 18 can take the necessary steps to handle any message fragment left by the caller. Again, the message sent to the VMS 18 may provide instructions for handling the message fragment, or the VMS 18 may be configured to handle the message fragment in a defined manner without input from the switch 14. The caller and user will continue their call via the conference previously established by the switch 14 until the call is ended. Alternatively, the telephone terminal 16 may be configured to automatically dial the service activation code on behalf of the user upon receiving any indication that the user has decided to initiate call screening.

Figure 5:
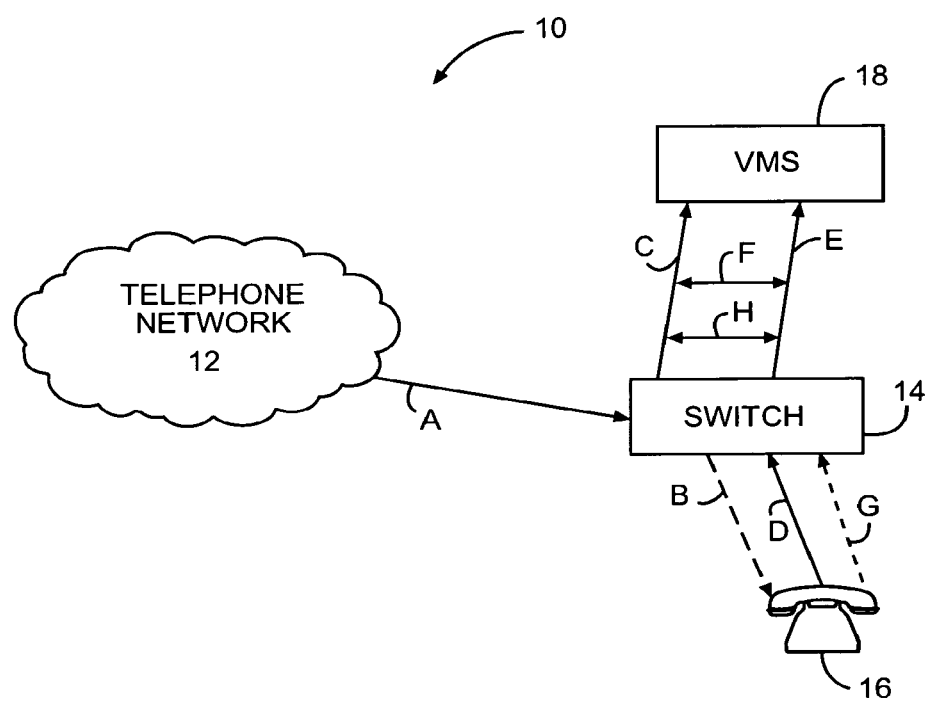
FIG. 5 illustrates an exemplary call flow according to a fourth embodiment of the present invention.

In yet another embodiment as illustrated in FIG. 5, an incoming call intended for the telephone terminal 16 is received by the switch 14 (step A), which takes the necessary steps to ring the telephone terminal 16 (step B). After a prescribed number of rings, the incoming call is forwarded to the VMS 18 by the switch 14 (step C). While the call is being answered by the VMS 18, the user may activate the telephone terminal 16, and upon receiving a dial tone, can dial a directory number to initiate call screening (step D). The directory number is a number assigned to the VMS 18. The switch 14 will receive the dialed number and initiate a call to the VMS 18 (step E). The VMS 18 will answer the user's call and recognize that it is currently answering the original incoming call intended for the user, as well as recognizing that the current call is being received from the user, preferably using associated caller ID information from the user and called party information for the original incoming call. In this circumstance, the VMS 18 will effect a conference between the original incoming call and the call from the user, directly or indirectly, within the VMS 18 or through the switch 14, such that a connection between the calls is effected (step F). During this time, it is preferred that the microphone of the telephone terminal 16 be turned off or otherwise muted, and the speaker channel be open, such that the user may listen to the message being left in the VMS 18. Alternatively, the telephone terminal 16 may be configured to automatically dial the directory number to initiate call screening upon receiving any indication that the user desires the same.

If the user decides to take the call, such as by providing an in-band or out-of-band signal such as a special activation code (step G), the VMS 18 will receive the signal and take the necessary steps to bridge the two calls internally or externally, preferably by instructing the switch 14 to provide the necessary connection in order to avoid wasting resources of the VMS 18 (step H). At this point, the VMS 18 will have dropped out of the respective calls if the VMS 18 is not providing the bridge, and will handle any message fragment as desired. The user and caller may then continue with their call.

Figure 6:
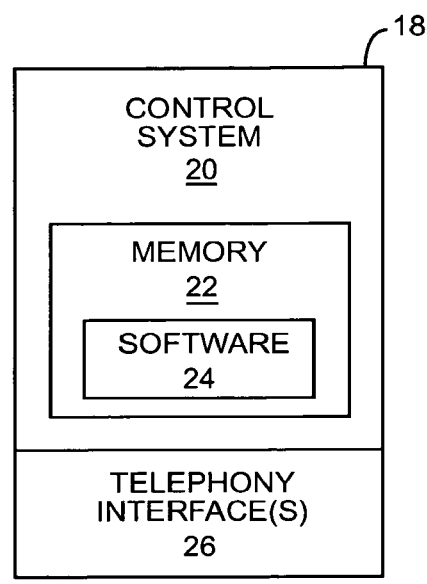
FIG. 6 is a block representation of a voicemail system according to the present invention.

With reference to FIG. 6, a block representation of the VMS 18 is illustrated. In general, the VMS 18 will include a control system 20 associated with sufficient memory 22 to store the requisite software 24 to provide the functionality described above. The control system 20 will also be associated with one or more telephony interfaces 26 to provide voice and signaling between the telephone network 12, the switch 14, and any other necessary call processing or serving entities.

Figure 7:
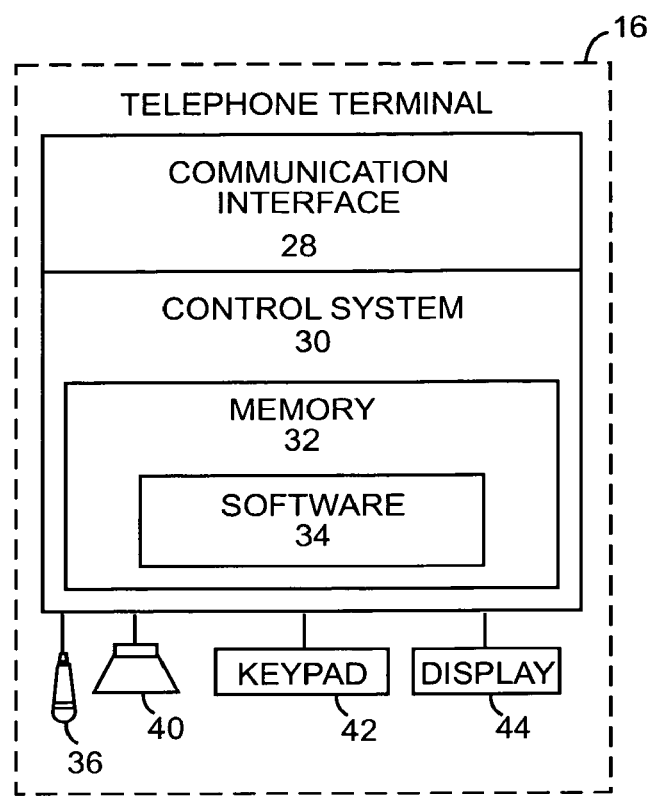
FIG. 7 is a block representation of a telephone terminal according to one embodiment of the present invention.

FIG. 7 provides a block representation of a telephone terminal 16 according to one embodiment of the present invention. The telephone terminal 16 will preferably include a communication interface 28 capable of directly or indirectly establishing communications with the switch 14. The communication interface 28 is operably associated with a control system 30 having the requisite memory 32 and software 34 to facilitate operation as described above. The control system 30 will operate to control a microphone 36, speaker 40, keypad 42, and display 44 to effectively facilitate calls and allow any necessary user input to initiate calls, answer calls, or provide special feature activation codes as described. In select embodiments, the control system 30 will operate to activate the speaker 40 independently of the microphone 36, such that the user can listen to voicemail messages being left at the VMS 18 without concern for the caller hearing the user, since the microphone 36 is deactivated. If a call is taken, the microphone 36 is then activated to support bi-directional communications. The speaker channel is formed by any necessary electronics to provide information to the telephone terminal's connection to be amplified and provided to the user via the speaker 40. Those skilled in the art will recognize the various control techniques for providing the above-described functionality.

Figure 8:
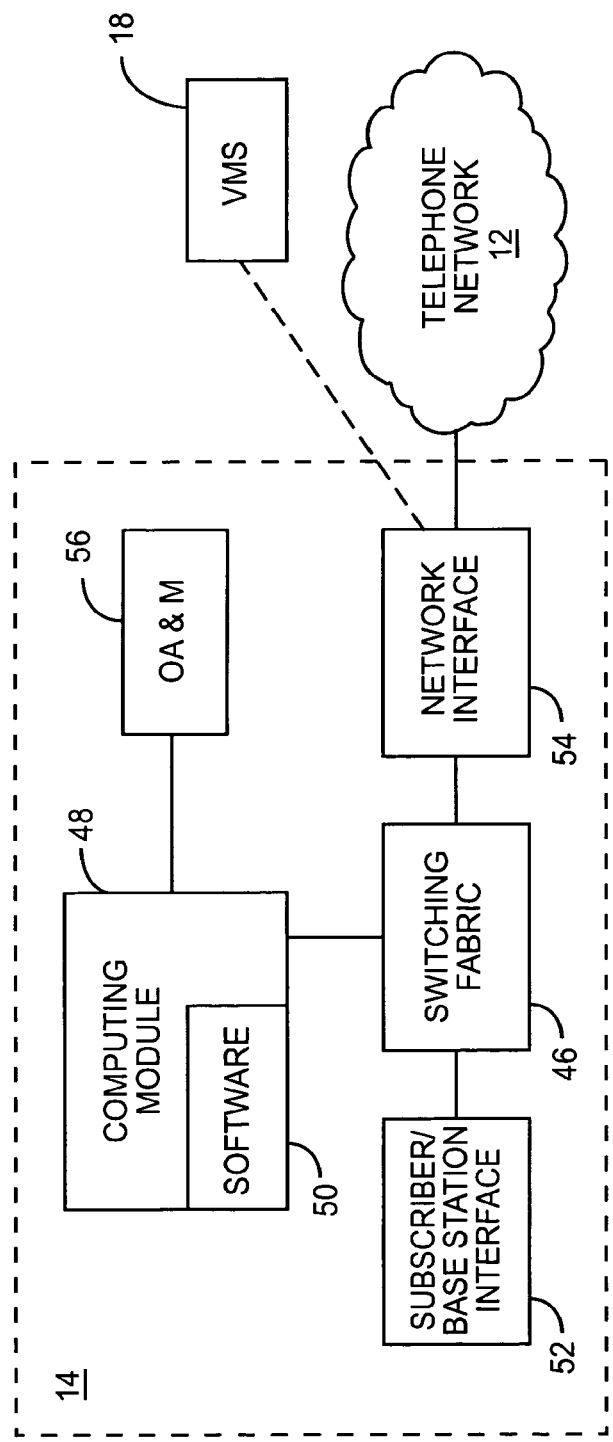
FIG. 8 is a block representation of a telephony switch according to one embodiment of the present invention.

Turning now to FIG. 8, a block representation of a switch 14 is illustrated. The switch 14 is represented generically and is intended to cover the logical functionality of land-based and mobile switching systems, packet-based or circuit-switched, which include all control for call server-based functions. These switches 14 may be implemented in a variety of ways using different equipment types, such as Nortel Networks Limited's DMS-100 local switching system. The switch 14 typically includes a switching fabric module 46, a computing module 48, including storage software 50, a subscriber/base station interface 52, a network interface 54, and an operations/administration and maintenance (OA & M) module 56. The switching fabric 46 may comprise logical and physical switches for interconnecting the subscriber/base station interface 52 with the remainder of the telephone network 12 or VMS 18 through the network interface 54. Depending on a land-based or wireless embodiment, the subscriber/base station interface 52 will either directly support subscribers through subscriber lines or will support base stations, which facilitate wireless communications with mobile devices. As illustrated, the computing module 48 controls circuit-switched communications via the switching fabric 46 and is capable of providing traditional intelligent network monitoring and functions. The functionality of the switch 14 may be provided in various levels of integration. In select embodiments, the software 50 of the computing module 48 is modified to facilitate the above-described functionality, by cooperating directly or indirectly with the telephone terminal 16 and VMS 18.

From the above, the present invention allows a user to effectively screen calls when using a hosted voicemail system, and accept those calls as desired. The various embodiments provide viable alternatives depending on the desires of the service provider and willingness of the user to participate in or initiate call screening. Those skilled in the art will recognize the applicability of the present invention to both circuit-switched and packet-based telephone systems, in both wired and wireless environments.

Those skilled in the art will recognize improvements and modifications to the preferred embodiments of the present invention. All such improvements and modifications are considered within the scope of the concepts disclosed herein and the claims that follow.

What is claimed is:

1. A method for providing voicemail services, comprising:
   a first server receiving a first call from a first terminal directed to a second terminal;
   in response to the first call, the first server initiating a second call to the second terminal, wherein the first server is configured to provide information identifying the first terminal to the second terminal;
   the first server recording at least a portion of a message being left by the first terminal; and
   the first server allowing the second terminal to monitor the message being left by the first terminal, wherein during monitoring the second terminal is configured to receive audio from the first terminal, wherein, in response to input from the second terminal, the first server is configured to connect the first terminal and the second terminal, wherein the input is to establish bi-directional communication with the first terminal, and wherein, after connecting the first terminal and the second terminal, the second terminal is configured to communicate with the first terminal in a bi-directional manner.

2. The method of claim 1, wherein the first call is directed to the first server instead of the second terminal.

3. The method of claim 1, wherein the second terminal is configured to ring in response to the second call.

4. The method of claim 1, wherein said allowing the second terminal to monitor the message being left by the first terminal comprises sending a first signal to the second terminal to open a speaker channel.

5. The method of claim 1, wherein said allowing the second terminal to monitor the message being left by the first terminal is performed in response to the second terminal not answering the second call.

6. The method of claim 1, further comprising:
the first server connecting the first terminal and the second terminal in response to the second terminal answering the second call.

7. The method of claim 1, further comprising:
in response to input from the second terminal while the message is being left by the first terminal, the first server connecting the first terminal and the second terminal.

8. A computer server for providing voicemail services, wherein the computer server comprises:
communication circuitry, configured to perform communication over a network; and
processing hardware coupled to the communication circuitry, wherein the processing hardware is configured to operate with the communication circuitry to:
receive a first call from a first terminal directed to a second terminal;
in response to the first call, initiate a second call to the second terminal, wherein the computer server is configured to provide information identifying the first terminal to the second terminal;
record at least a portion of a message being left by the first terminal; and
allow the second terminal to monitor the message being left by the first terminal, wherein during monitoring the second terminal is configured to receive audio from the first terminal, and wherein, in response to input from the second terminal, the computer server is configured to connect the first terminal and the second terminal, wherein the input is to establish bi-directional communication with the first terminal, and wherein, after connecting the first terminal and the second terminal, the second terminal is configured to communicate with the first terminal in a bi-directional manner.

9. The computer server of claim 8, wherein the first call is directed to the computer server instead of the second terminal.

10. The computer server of claim 8, wherein the second terminal is configured to ring in response to the second call.

11. The computer server of claim 8, wherein during monitoring the second terminal is configured to receive audio from the first terminal in a uni-directional manner, wherein the input is to establish bi-directional communication with the first terminal, and wherein, after connecting the first terminal and the second terminal, the second terminal is configured to communicate with the first terminal in a bi-directional manner.

12. The computer server of claim 8, wherein said allowing the second terminal to monitor the message being left by the first terminal is performed in response to the second terminal not answering the second call.

13. The computer server of claim 8, wherein the processing hardware is further configured to connect the first terminal and the second terminal in response to the second terminal answering the second call.

14. A first terminal, configured to receive voicemail services from a first server, wherein the terminal comprises:
communication circuitry, configured to perform communication over a network;
an audio input;
an audio output; and
processing hardware coupled to the communication circuitry, wherein the processing hardware is configured to operate with the communication circuitry to:
in response to a first call from a second terminal directed to the first terminal, receive a second call from the first server, including information identifying the second terminal;
receive and provide audio of an audio message of the second terminal using the audio output, wherein the audio is received from the first server while the first server is recording at least a portion of the audio message from the second terminal;
wherein, in response to input while the first terminal provides audio of the audio message, the first server is configured to connect the first terminal and the second terminal, wherein the input is to establish bi-directional communication with the second terminal, and wherein, after connecting the first terminal and the second terminal, the first terminal is configured to communicate with the second terminal in a bi-directional manner.

15. The first terminal of claim 14, wherein the first call is directed to the first server instead of the first terminal.

16. The first terminal of claim 14, wherein the first terminal is configured to ring in response to the second call.

17. The first terminal of claim 14, wherein the audio of the audio message comprises communication with the second terminal in a uni-directional manner, wherein the input is to establish bi-directional communication with the second terminal, and wherein, after connecting the first terminal and the second terminal, the first terminal is configured to communicate with the second terminal in a bi-directional manner.

18. The first terminal of claim 14, wherein receiving and providing the audio of the audio message is performed in response to the first terminal not answering the second call.

19. The first terminal of claim 14, wherein the first server is further configured to connect the first terminal and the second terminal in response to input received to the first terminal to answer the second call.

* * * * *